United States Patent
Nuida et al.

(10) Patent No.: US 11,440,092 B2
(45) Date of Patent: Sep. 13, 2022

(54) METHOD FOR MANUFACTURING COPPER POWDER, RESIN COMPOSITION, METHOD FOR FORMING CURED PRODUCT, AND CURED PRODUCT

(71) Applicant: ADEKA CORPORATION, Tokyo (JP)

(72) Inventors: Yusuke Nuida, Tokyo (JP); Hiroshi Morita, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 503 days.

(21) Appl. No.: 16/484,268

(22) PCT Filed: Dec. 7, 2017

(86) PCT No.: PCT/JP2017/043985
§ 371 (c)(1),
(2) Date: Aug. 7, 2019

(87) PCT Pub. No.: WO2018/163543
PCT Pub. Date: Sep. 13, 2018

(65) Prior Publication Data
US 2020/0001371 A1    Jan. 2, 2020

(30) Foreign Application Priority Data
Mar. 8, 2017 (JP) .............................. JP2017-043787

(51) Int. Cl.
| | |
|---|---|
| *B22F 9/24* | (2006.01) |
| *B22F 1/102* | (2022.01) |
| *C08L 57/00* | (2006.01) |
| *C08L 61/04* | (2006.01) |
| *C08L 67/00* | (2006.01) |
| *C08J 7/044* | (2020.01) |
| *C08K 3/08* | (2006.01) |

(52) U.S. Cl.
CPC ............... *B22F 1/102* (2022.01); *B22F 9/24* (2013.01); *C08J 7/044* (2020.01); *C08L 57/00* (2013.01); *C08L 61/04* (2013.01); *C08L 67/00* (2013.01); *B22F 2301/10* (2013.01); *B22F 2998/10* (2013.01); *C08K 2003/085* (2013.01); *C08L 2203/16* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 4,791,239 A * | 12/1988 | Shirahata | ............... | H05K 1/056 361/792 |
| 2003/0216505 A1* | 11/2003 | Akiba | .................. | C08L 101/00 524/588 |
| 2011/0155432 A1* | 6/2011 | Tomonari | ............. | C09D 17/006 174/257 |
| 2013/0177471 A1* | 7/2013 | Kaneshiro | ............... | B22F 1/052 75/370 |
| 2014/0203222 A1* | 7/2014 | Ito | ............................ | H01B 1/22 252/512 |
| 2016/0168395 A1* | 6/2016 | Ohnishi | .................. | C23C 16/06 427/124 |
| 2016/0340540 A1* | 11/2016 | Brust | ................... | C08F 220/585 |
| 2019/0019594 A1* | 1/2019 | Ishii | ....................... | C22C 13/02 |

FOREIGN PATENT DOCUMENTS

| | | |
|---|---|---|
| JP | 62-99406 | 5/1987 |
| JP | 9-82133 | 3/1997 |
| JP | 2002-115001 | 4/2002 |
| JP | 2003-141929 | 5/2003 |
| JP | 2008-138286 | 6/2008 |
| JP | 2016-14181 | 1/2016 |
| WO | 2014/104032 | 7/2014 |
| WO | 2017/007011 | 1/2017 |

OTHER PUBLICATIONS

English Translation of JP 09-82133 (originally published Mar. 28, 1997) from Espacenet.*
International Search Report dated Feb. 13, 2018 in International (PCT) Application No. PCT/JP2017/043985.

* cited by examiner

*Primary Examiner* — George Wyszomierski
(74) *Attorney, Agent, or Firm* — Wenderoth, Lind & Ponack, L.L.P.

(57) ABSTRACT

A method of manufacturing copper powder according to the present invention includes: a first step of reducing copper particles in water by using at least one compound selected from the group consisting of potassium borohydride, sodiumborohydride, and lithium borohydride; after the first step, a second step of washing with water; a third step of washing copper powder obtained in the second step with at least one compound selected from the group consisting of ether compounds and alcohol compounds; and a fourth step of bringing the copper powder obtained in the third step into contact with an organic acid solution, in which at least one compound selected from the group consisting of ether compounds and alcohol compounds is used as a solvent.

1 Claim, No Drawings

METHOD FOR MANUFACTURING COPPER POWDER, RESIN COMPOSITION, METHOD FOR FORMING CURED PRODUCT, AND CURED PRODUCT

TECHNICAL FIELD

The present invention relates to a method for manufacturing copper powder, and a resin composition including a specific resin and the copper powder produced by the manufacturing method. The copper powder of the present invention is copper powder applicable as electrical conducting materials for various applications, such as an electrical conducting filler for use in electrical conducting pastes for forming electrical circuits or forming external electrodes of ceramic capacitors.

BACKGROUND ART

Copper powder has been used as electrical conducting material for various applications such as electrodes or circuits of electronic parts or the like, and various proposals have been made for methods of manufacturing copper powder.

For example, Patent Document 1 discloses a method of manufacturing copper powder by obtaining a copper oxide slurry though the addition of hydrazine and/or a hydrazine compound to a copper hydroxide slurry, performing reductive precipitation of copper powder from the copper oxide slurry by use of hydrazine and/or the hydrazine compound, and treating the copper powder with alcohol and further with a solution containing an aliphatic acid.

Moreover, Patent Document 2 discloses a method of manufacturing copper powder, characterized by including a first step of adding an alkali hydroxide to a mixture of a copper salt aqueous solution containing divalent copper ions and a reductive saccharide serving as a first reducing agent so as to obtain a suspension containing copper suboxide particles, a second-1 step of adding a second reducing agent to the suspension containing the copper suboxide particles so as to obtain a suspension containing copper superfine particles and the copper suboxide particles, and a second-2 step of adding one or more reducing agents to the suspension containing the copper superfine particles and the copper suboxide particles so as to obtain copper fine particles, the one or more reducing agents being selected from the group consisting of hydrazine compounds and ascorbic acid. Moreover, the paragraph [0058] of Patent Document 2 discloses that the second reducing agent for use in the second-1 step is preferably sodium borohydride.

PRIOR ART DOCUMENTS

Patent Document

[Patent Document 1] JPS 62-099406 A
[Patent Document 2] WO 2014/104032

SUMMARY OF INVENTION

Problem to Solved by the Invention

However, it has been a problem that a coating film is poor in volume resistance when the coating film is formed from a resin composition prepared from copper powder manufactured by using a conventionally well-known method of manufacturing copper powder such as those disclosed in Patent Documents 1 and 2, and a resin such as a phenol resin in combination.

Therefore, an object of the present invention is to provide a method of manufacturing copper powder making it possible to produce a resin composition, which contains copper powder and at least one resin selected from the group consisting of phenol resins, polyester resins and acrylic resins, and which allows the production of a cured product from which a coating film with a good volume resistance can be produced.

Means for Solving the Problem

The present inventors have diligently studied to overcome the problem and, as a result thereof, found that the problem can be solved by the use of copper powder manufactured by a certain manufacturing method, thereby arriving at the present invention.

That is, the present invention is a method of manufacturing copper powder including: a first step of reducing copper particles in water by using at least one compound selected from the group consisting of potassium borohydride, sodium borohydride, and lithium borohydride; after the first step, a second step of washing with water; a third step of washing copper powder obtained in the second step with at least one compound selected from the group consisting of ether compounds and alcohol compounds; and a fourth step of bringing the copper powder obtained in the third step into contact with an organic acid solution, in which at least one compound selected from the group consisting of ether compounds and alcohol compounds is used as a solvent.

Moreover, the present invention is a resin composition including: copper powder obtained in a method of manufacturing copper powder according to this invention [hereinafter, the copper powder may be referred to as component (A)]; and at least one resin selected from the group consisting of phenol resins, polyester resins, and acrylic resins [hereinafter the at least one resin may be referred to as component (B)].

Effects of the Invention

According to the present invention, it is possible to produce a resin composition, which contains certain copper powder and at least one resin selected from the group consisting of phenol resins, polyester resins and acrylic resins, and which allows to produce a cured product from which a coating film with a good volume resistance can be produced. Moreover, according to the present invention, it is possible to produce copper powder usable to produce the resin composition.

BEST MODE FOR CARRYING OUT THE INVENTION

The present invention will be described below in more detail.

A method of manufacturing copper powder according to the present invention is characterized by including: a first step of reducing copper particles in water by using at least one compound selected from the group consisting of potassium borohydride, sodium borohydride, and lithium borohydride; after the first step, a second step of washing with water; a third step of washing the copper powder obtained in the second step with at least one compound selected from the group consisting of ether compounds and alcohol compounds; and a fourth step of bringing the copper powder obtained in the third step into contact with an organic acid solution, in which at least one compound selected from the group consisting of ether compounds and alcohol compounds is used as a solvent.

Here, in this method according to the present invention, the first step is a step of reducing copper particles in water by using at least one compound selected from the group consisting of potassium borohydride, sodium borohydride, and lithium borohydride.

The copper particles used in the first step are not particularly limited and may be general and well-known copper particles. The copper particles are not particularly limited in terms of particle diameter. For example, when the copper powder is to be used as a filler in a later-described composition with a phenol resin, copper particles with an average particle diameter of several nm to several hundred μm can be used, and copper particles with an average particle diameter of several nm to several tens μm can be used preferably. The average particle diameter of the copper particles can be worked out by a laser optical diffraction method with a particle diameter distribution measuring device as a particle diameter ($D_{50}$) at which cumulative volume particle distribution is 50%.

Moreover, if the copper particles to be used in the first step are oxidized due to air oxidation etc., it is preferable to wash the copper particles with an aqueous solution of an inorganic or organic acid prior to the first step. The aqueous solution may preferably be an aqueous solution of sulfuric acid, for example.

The method of reducing copper particles in water performed in the first step by using at least one compound selected from the group consisting of potassium borohydride, sodium borohydride, and lithium borohydride may be carried out by a general and well-known method. For instance, it is preferable to perform the reducing by adding the copper particles into water in advance to prepare a copper slurry of 10 to 40 mass % in concentration, and adding, to the copper slurry, the at least one compound selected from the group consisting of potassium borohydride, sodium borohydride, and lithium borohydride.

Moreover, the temperature during the reducing treatment may preferably be in a range of 10° C. to 80° C., more preferably in a range of 15° C. to 70° C., and especially preferably in a range of 20° C. to 50° C. The reducing time may preferably be in a range of 10 to 300 min, and especially preferably for 30 to 90 min. Furthermore, the at least one compound selected from the group consisting of potassium borohydride, sodium borohydride, and lithium borohydride may preferably be in a range of 0.1 to 5 mass % and more preferably in a range of 0.5 to 2 mass % in an aqueous solution with respect to an amount of the copper particles. Among the group consisting of potassium borohydride, sodium borohydride, and lithium borohydride from which the at least one compound selected, copper powder produced by using sodium borohydride is preferable due to low volume resistance of a coating film formed from a later-described composition of the copper powder and a phenol resin.

The second step of the present invention is a step of washing with at least one washing liquid selected from the group consisting of water, methanol, and ethanol. Among these washing liquids, it is preferable to at least use water, and it is especially preferable to use water only. The washing performed in the second step is not particularly limited in terms of washing methods, and may be performed by a general and well-known method. For example, in cases where the washing liquid is water, the washing may be carried out by bringing the copper powder obtained in the first step into contact with water of 5° C. to 90° C. or with water vapor. It is especially preferable that the washing be carried out by bringing the copper powder into contact with water of 10° C. to 50° C., and it is preferable that washing be carried out by immersing the copper powder in water or by showering the copper powder with water.

The third step of the present invention is a step of washing the copper powder obtained by the second step with at least one compound selected from the group consisting of ether compounds and alcohol compounds. Examples of ether compounds usable in the third step include tetrahydrofuran, tetrahydropyran, morpholine, ethylene glycol dimethyl ether, diethylene glycol dimethyl ether, dipropylene glycol dimethyl ether, triethylene glycol dimethyl ether, dibutyl ether, diethyl ether, dioxane, and the like compounds. Moreover, examples of the alcohol compounds usable in the third step include methanol, ethanol, propanol, 2-propanol, 1-butanol, isobutanol, 2-butanol, tertiary butanol, pentanol, isopentanol, 2-pentanol, neopentanol, tertiary pentanol, hexanol, 2-hexanol, heptanol, 2-heptanol, octanol, 2-ethylhexanol, 2-octanol, cyclopentanol, cyclohexanol, cycloheptanol, methylcyclopentanol, methylcyclohexanol, methylcycloheptanol, benzyl alcohol, ethylene glycolmonomethylether, ethyleneglycolmonoethyl ether, propylene glycol monomethyl ether, propylene glucol monoethyl ether, diethylene glycol monomethyl ether, diethylene glycol monoethyl ether, triethylene glycol monomethyl ether, triethylene glycol monoethyl ether, 2-(N,N-dimethyl amino) ethanol, 3(N,N-dimethyl amino) propanol, ethylene glycol, propylene glycol, 1,2-butanediol, 1,3-butanediol, 1,4-butanediol, 1,5-pentanediol, neopenthyl glycol, isoprene glycol (3-methyl-1,3-butanediol), 1,2-hexanediol, 1,6-hexanediol, 3-methyl-1,5-pentanediol, 1,2-octanediol, octanediol (2-ethyl-1,3-hexanediol), 2-butyl-2-ethyl 1,3-propanediol, 2,5-dimethyl-2,5-hexanediol, 1,2-cyclohexanediol, 1,4-cyclohexanediol, 1,4-cyclohexane dimethanol, and similar compounds. Among these compounds, tetrahydrofuran, methanol, ethanol, propanol, and isopropanol are preferably used, and among them, isopropanol is especially preferably used.

The washing performed in the third step is not particularly limited in terms of washing methods, and may be carried out by a general and well-known method. For example, the washing may be carried out by bringing the copper powder obtained in the second step into contact with the at least one compound, which is selected from the group consisting of ether compounds and alcohol compounds, and which is at a temperature in a range of 5° C. to 90° C., or by bringing the copper powder into contact with vapor of the at least one compound, so as to remove moisture in the copper powder. Especially, it is preferable to contact the copper powder with at least one compound, which is selected from the group consisting of ether compounds and alcohol compounds, and which is at a temperature in a range of 10° C. to 50° C., and the contact may be carried out by immersing the copper powder in the at least one compound, showering the copper powder with the at least one compound, or the like method.

The fourth step of the present invention is a step of bringing the copper powder obtained in the third step into contact with an organic acid solution or organic amine solution, in which at least one compound selected from the group consisting of ether compounds and alcohol compounds is used as a solvent.

The ether compounds and alcohol compounds usable in the fourth step may be the ether compounds and alcohol compounds exemplified for the third step. It is preferable to use the same ether compounds and alcohol compounds in the fourth step as used in, the third step.

The organic acid in the organic acid solution used in the fourth step is not particularly limited and may be a general and well-known organic acid, such as carboxylic acid, sulfonic acid, and sulfinic acid, for example. Specific examples of compounds usable as the organic acid include: monovalent carboxylic acids such as formic acid, acetic acid, propionic acid, butanoic acid, benzoic acid, stearic acid, oleic acid, linolic acid, lauric acid and the like; multivalent carboxylic acids such as oxalic acid, succinic acid, adipic acid, itaconic acid, terephthalic acid, butanetetracarboxylic acid, and the like; oxyacids such as lactic acid, tartaric acid, malic acid, citric acid, gluconic acid, and the like; sulfonic acids such as methanesulfonic acid, benzenesulfonic acid, toluenesulfonic acid, and the like; sulfinic acids such as benzenesulfinic acid, toluenesulfinic acid, and the like; and lactone-structured natural products such as L-ascorbic acid, isoascorbic acid, and the like. Among them, $C_{10}$ to $C_{25}$ organic carboxylic acids such as stearic acid, oleic acid, linolic acid and lauric acid, and malic acid are preferable, stearic acid, oleic acid, linolic acid, and lauric acid are more preferable, and stearic acid and oleic acid are especially preferable.

The organic amine in the organic amine solution used in the fourth step is not particularly limited and may be a general and well-known organic acid. As the organic amine, aliphatic primary monoamines are preferably usable. Among them, $C_6$ to $C_{20}$ organic amines are preferable. Examples of the organic amines include octyl amine, trioctyl amine, dioctyl amine, hexadecyl amine, dodecyl amine, tetradecyl amine, stearyl amine, oleyl amine, myristyl amine, lauryl amine, and the like. Among them, oleyl amine is especially preferable.

In the fourth step, the method for bringing the copper powder obtained in the third step into contact with an organic acid solution or organic amine solution, in which at least one compound selected from the group consisting of ether compounds and alcohol compounds is used as a solvent, may be carried out, for example, by immersing the copper powder in the compound, or by showering the copper powder with the compound.

The use of the copper powder manufactured through the first to fourth steps [component (A)] as copper powder of a later-described resin composition containing copper powder and at least one resin selected from the group consisting of phenol resins, polyester resins, and acrylic resins provides the resin composition with such a distinctive characteristic feature that a cured produce or coating film produced from the resin composition attains a much greater volume resistance than resin compositions in which the copper powder is prepared by the other manufacturing method. To find out the reasons thereof, the applicant of the present invention conducted surface analysis and electric property analysis on the copper powder prepared by the manufacturing method of the present invention in order to try to characteristically define the copper powder in terms of its shape or parameters, but only failed to distinguish the copper powder of this invention from copper powder prepared by the other manufacturing methods as in the later-described comparative examples, concluding that state-of-art particle analysis techniques that the applicant of the present invention had are not capable of defining the copper powder prepared by the manufacturing method of the present invention in terms of its character, properties, shape, etc, and failed to find the reason why the copper powder prepared by the manufacturing method of this invention uniquely shows the distinctive characteristic feature.

Next, a resin composition according to the present invention will be explained below.

A resin composition according to the present invention is characterized by including (A) the copper powder manufactured through the first to fourth steps as described above, and (B) at least one resin selected from the group consisting of phenol resins, polyester resins, and acrylic resins.

The component (A) used in the resin composition of the present invention is the copper powder manufactured by the manufacturing method described above. Concentration of the component (A) in the resin composition of the present invention is not particularly limited and may be varied as appropriate according to a desired shape and thickness of the cured product. However, for the sake of good electric conductivity, the concentration of the component (A) in the resin composition of the present invention is preferably in a range of 20 to 95 mass %, more preferably in a range of 50 to 95 mass %, and especially preferably in a range of 75 to 95 mass %.

The component (B) used in the resin composition according to the present invention is at least one resin selected from the group consisting of phenol resins, polyester resins and acrylic resins.

Here, the phenol resins are not particularly limited and may be general and well-known phenol resins, such as novolac-type phenol resins and resol-type phenol resins. Among them, resol-type phenol resins are preferable. Commercially available resins may be used and examples thereof include powdered phenol resins (Product name: Resitop, PGA-4528, PGA-2473, PGA-4704, PGA-4504 from Gun Ei Chemical Industry Co, Ltd, Product Name: Sumilite resin PR-UFC-504, PR-EPN, PR-ACS-100, PR-ACS-150, PR-12687, PR-13355, PR-16382, PR 217, PR-310, PR-311, PR-50064, PR-50099, PR-50102, PR-50252, PR-50395, PR-50590, PR-50590B, PR-50699, PR-50869, PR-51316, PR-51326B, PR-51350B, PR-51510, PR-51541B, PR-51794, PR-51820, PR-51939, PR-53153, PR-53364, PR-53497, PR-53724, PR-53769, PR-53804, PR-54364, PR-54458A, PR-54545, PR-55170, PR-8000, PR-FTZ-1, PR-FTZ-15 from Sumitomo Bakelite Co., Ltd), Flaked phenol resins (Product Name: Sumilite resin PR-12686R, PR-13349, PR-50235A, PR-51363F, PR-51494G, PR-51618G, PR-53194, PR-53195, PR-54869, PR-F-110, PR-F-143, PR-F-151F, PR-F-85G, PR-HF-3, PR-HF-6 from Sumitomo Bakelite Co., Ltd), liquid phenol resins (Product name: Sumilite resin PR-50087, PR-50607B, PR-50702, PR-50781, PR-51138C, PR-51206, PR-51663, PR-51947A, PR-53123, PR-53338, PR-53365, PR-53717, PR-54135, PR-54313, PR-54562, PR-55345, PR-940, PR-9400, PR-967 from Sumitomo Bakelite Co., Ltd), resole-type liquid phenol resins (Product name: Resitop PL-4826, PL-2390, PL-4690, PL-3630, PL-4222, PL-4246, PL-2211, PL-3224, PL-4329, PL-5208 from Gun Ei Chemical Industry Co., Ltd, Product name; Sumilite resin PR-50273, PR-51206, PR-51781, PR-53056, PR-53311, PR-53416, PR-53570, PR-54387 from Sumitomo Bakelite Co, Ltd), fine particle phenol resins (Product name: Bellpearl, R800, R700, R600, R200, R100, S830, S870, S890, S895, S290, S190 from Air Water Inc.), spherical phenol resins (Product name: Marilin GU-200, FM-010, FM-150, HF-008, HP-015, HF-075, HF-300, HF-500, HF-1500 from Gun Ei Chemical Industry Co., Ltd), solid phenol resins (Product name; Resitop PS-2601, PS-2607, PS-2655, PS-2768, PS-2608, PS-4609, PSM-2222, PSK-2320, PS-6132 from Gun Ei Chemical Industry Co., Ltd) and the like.

Moreover, the polyester resins are not particularly limited, as long as the polyester resins are produced by esterification of a polybasic acid component and a multivalent alcohol component. For example, the polybasic acid component may be at least one of dibasic acids such as diphenolic acid, acid phthalic anhydride, isophthalic acid, terephthalic acid, succinic acid, fumaric acid, adipic acid, azelaic acid, sebacic acid, dimer acid, and the like, or lower alkyl ester compounds thereof, and may further include a monobasic acid (such as benzoic acid, crotonic acid, and p-t-butyl benzoic acid), a polyvalent basic acid greater than trivalent (such as trimellitic acid, methyl cyclohexene tricarboxylic acid, and pyromellitic anhydride) or the like. Commercially available products may be used, such as Vylon 300, Vylon 500, Vylon 560, Vylon 600, Vylon 630, Vylon 650, Vylon 670, Vylon GK130, Vylon GK140, Vylon GK150, Vylon GK190, Vylon GK330, Vylon GK590, Vylon GK680, Vylon GK780, Vylon GK810, Vylon GK890, Vylon GK200, Vylon GK226, Vylon GK240, Vylon GK245, Vylon GK270, Vylon GK280, Vylon GK290, Vylon GK296, Vylon GK660, Vylon GK885, Vylon GK250, Vylon GK360, Vylon GK640, and Vylon GK880 from Toyobo Co., Ltd., Elitel UE-3220, Elitel UE-3500, Elitel UE-3210, Elitel UE-3215, Elitel UE-3216, Elitel UE-3620, Elitel UE 3240, Elitel UE-3250, Elitel UE-3300, Elitel UE-3200, Elitel UE-9200, Elitel UE-3201, Elitel UE-3203, Elitel UE-3350, Elitel UE-3370, Elitel UE-3380, Elitel UE-3600, Elitel UE-3980, Elitel UE-3660, Elitel UE-3690, Elitel UE-9600 and Elitel UE-9800 from Unitika Ltd., ARON MELT PES-310, ARON MELT PES-318, ARON MELT PES-334, ARON MELT PES-316, and ARON MELT PES-360 from Toagosei Co., Ltd., or the like.

Among the polyester resins, polyester resins with a number average molecular weight in a range of 10,000 to 50,000 based on Vapor Pressure Osmometry (VPO) and a glass transition point in a range of −35° C. to 35° C. are preferable and polyester resins with a number average molecular weight in a range of 15,000 to 40,000 and a glass transition point in a range of 0° C. to 35° C. are especially preferable. The glass transition point is a temperature measurable by Suggesting Scanning calorimetry (DSC) according to ASTM 3418/82.

Furthermore, the acrylic resins are also not particularly limited and may be general and well-known acrylic resins. The acrylic resins may be provided by synthesizing from polymerization of an acrylate compound or methacrylate compound as a raw material, or by providing a commercially available product. Examples of the commercially available acrylic resins include Acrypet MD, VH, MF, V [Mitsubishi Rayon Co, Ltd.], Hi-pearl M-4003, M-4005, M-4006, M-4202, M-5000, M-5001, M-4501 [Negami Chemical Industrial Co., Ltd.], Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117, BR-118, and the like [Mitsubishi Rayon Co., Ltd.] and the like, but are not limited to these.

Among the acrylic resins, polyester resins with a weight average molecular weight in a range of 10,000 to 100,000 and a glass transition point in a range of 0° C. to 100° C. are preferable and acrylic resins with a number average molecular weight in a range of 20,000 to 80,000 and a glass transition point in a range of 10° C. to 90° C. are especially preferable. The glass transition point is a temperature measurable by Suggesting Scanning calorimetry (DSC) according to ASTM 3418/82. The weight average molecular weight in this specification refers to a polystyrene-based weight average molecular weight measured by gel permeation chromatography analysis using tetrahydrofuran as a solvent. The "weight average molecular weight" in this specification may be synonymously referred to as "mass average molecular weight" in the technical field to which the present invention belongs.

The concentration of the component (B) in the resin composition of the present invention is not particularly limited and may be varied as appropriate according to a desired shape or thickness of the cured product For the sake of good electric conductivity, the concentration of the component (B) in the resin composition of the present invention is preferably in a range of 5 to 80 mass %, more preferably in a range of 5 to 50 mass %, and especially preferably in a range of 5 to 25 mass %.

As long as the effect of the present invention is attained, the resin composition may include a solvent, an antioxidant, a silane coupling agent, or the like in addition.

The solvent may be water or an organic solvent, for example. Here, examples of the organic solvent include alcohol type solvents, diol type solvents, ketone type solvents, ester type solvents, ether type solvents, aliphatic or alicyclic hydrocarbon type solvents, aromatic hydrocarbon type solvents, cyano-modified hydrocarbon type solvents, halogenated aromatic hydrocarbon type solvents, and the other solvents.

Examples of the alcohol type solvents include methanol, ethanol, propanol, 2-propanol, 1-butanol, isobutanol, 2-butanol, tertiary butanol, pentanol, isopentanol, 2-pentanol, neopentanol, tertiary pentanol, hexanol, 2-hexanol, heptanol, 2-heptanol, octanol, 2-ethylhexanol, 2-octanol, cyclopentanol, cyclohexanol, cycloheptanol, methylcyclopentanol, methylcyclohexanol, methylcycloheptanol, benzyl alcohol, ethylene glycol monomethyl ether, ethylene glycol monoethyl ether, propylene glycol monomethyl ether, propylene glucol monoethyl ether, diethylene glucol monomethyl ether, diethylene glycol monoethyl ether, triethylene glycol monomethyl ether, triethylene glycol monoethyl ether, 2-(N, N-dimethyl amino) ethanol, 3(N,N-dimethyl amino) propanol, and the like.

Examples of the diol type solvents include ethylene glycol, propylene glycol, 1,2-butanediol, 1,3-butanediol, 1,4-butanediol, 1,5-pentanediol, neopenthyl glycol, isoprene glycol (3-methyl-1,3-butanediol), 1,2-hexanediol, 1,6-hexanediol, 3-methyl-1,5-pentanediol, 1,2-octanediol, octanediol (2-ethyl-1,3-hexanediol), 2-butyl-2-ethyl-1,3-propanediol, 2,5-dimethyl-2,5-hexanediol, 1,2-cyclohexanediol 1,4-cyclohexanediol, 1,4-cyclohexanedimethanol, and the like.

Examples of the ketone type solvents include acetone, ethylmethyl ketone, methylisopropyl ketone, methylbutyl ketone, methylisobutyl ketone, methylamyl ketone, methylhexyl ketone ethylbutyl ketone, diethyl ketone, dipropyl ketone, diisobutyl ketone, methylamyl ketone, cyclohexanone, methyl cyclohexanone, and the like.

Examples of the ester type solvents include methyl formate, ethyl formate, methyl acetate, ethyl acetate, isopropyl acetate, butyl acetate, isobutyl acetate, secondary butyl acetate, tertiary butyl acetate, amyl acetate, isoamyl acetate, tertiary amyl acetate, phenyl acetate, methyl propionate, ethyl propionate, isopropyl propionate, butyl propionate, isobutyl propionate, secondary butyl propionate, tertiary butyl propionate, amyl propionate, isoamyl propionate, tertiary amyl propionate, phenyl propionate, methyl 2-ethylhexanoate, ethyl 2-ethylhexanoate, propyl 2-ethylhexanoate, isopropyl 2-ethylhexanoate, butyl 2-ethylhexanoate, methyl lactate, ethyl lactate, methyl methoxypropionate, methyl ethoxypropionate, ethyl methoxypropionate, ethyl ethoxypropionate, ethylene glycol monomethyl ether acetate, diethylene glycol monomethyl ether acetate, ethylene glycol monoethyl ether acetate, ethylene glycol monopropyl ether acetate, ethylene glycol monoisopropyl ether acetate, ethylene glycol monobutyl ether acetate, ethylene glycol mono-sec-butyl ether acetate, ethylene glycol monoisobutyl ether acetate, ethylene glycol mono-tert-butyl ether acetate, propylene glycol monomethyl ether acetate, propylene glycol monoethyl ether acetate, propylene glycol monopropyl ether acetate, propylene glycol monoisopropyl ether acetate, propylene glycol monobutyl ether acetate, propylene glycol mono-sec-butyl ether acetate, propylene glycol monoisobutyl ether acetate, propylene glycol mono-tert-butyl ether acetate, butylene glycol monomethyl ether acetate, butylene glycol monoethyl ether acetate, butylene glycol monopropyl ether acetate, butylene glycol monoisopropyl ether acetate, butylene glycol monobutyl ether acetate, butylene glycol mono-sec-butyl ether acetate, butylene glycol monoisobutyl ether acetate, butylene glycol mono-tert-butyl ether acetate, methyl acetoacetate, ethyl acetoacetate, methyl oxobutanoic acid, ethyl oxobutanoic acid, γ-lactone, dimethyl malonic acid, dimethyl succinic acid, propylene glycol diacetate, δ-lactone, and the like.

Examples of the ether type solvents include tetrahydrofuran, tetrahydropyran, morpholine, ethylene glycol dimethyl ether, diethylene glycol dimethyl ether, dipropylene glycol dimethyl ether, triethylene glycol dimethyl ether, dibutyl ether, diethyl ether, dioxane, and the like.

Examples of the aliphatic or alicyclic hydrocarbon type solvents include pentane, hexane, cyclohexane, methyl cyclohexane, dimethylcyclohexane, ethyl cyclohexane, heptane, octane, decalin, solvent naphtha, turpentine oil, D-limonene, pinene, mineral spirits, Swasolve #310 [Cosmo Matsuyama Oil Co., Ltd.], Solvesso #100 [Exxon chemical], and the like.

Examples of the aromatic hydrocarbon type solvents include benzene, toluene, ethylbenzene, xylene, mesitylene, diethyl benzene, cumene, isobutyl benzene, cumene, and tetralin.

Examples of the cyano group-containing hydrocarbon solvents include acetonitrile, 1-cyanopropane, 1-cyanobutane, 1-cyanohexane, cyanocyclohexane, cyanobenzene, 1,3-dicyanopropane, 1,4-dicyanobutane, 1,6-dicyanohexane, 1,4-dicyanocyclohexane, 1,4-dicyanobenzene, and the like.

Examples of the halogenated aromatic hydrocarbon type solvents include carbon tetrachloride, chloroform, trichloroethylene, methylene chloride, and the like.

Examples of the other organic solvents include N-methyl-2-pyrolidone, dimethyl sulfoxide, dimethyl formamide, aniline, triethyl amine, and pyridine.

The antioxidant may be a commercially available antioxidant such as dibutylhydroxytoluene, Irganox 1010, Irganox 1035FF, and Irganox 565 [BASF Japan], for example. The amount of the antioxidant used is preferably in a range of 0.0001 to 10 mass %.

The silane coupling agent may be a commercially available silane coupling agent such as epoxy type [KBM403 and KBM303 from Shin-Etsu Chemical Co., Ltd], vinyl type [KBM1003 from Shin-Etsu Chemical Co., Ltd.], acryl type silane coupling agent [KBM503 from Shin-Etsu Chemical Co., Ltd], and 3-ethyl(triethoxysilylpropoxymethyl) oxetane [TESOX from Toagosei Co Ltd], for example. The amount of the silane coupling agent used is preferably in a range of 0.0001 to 10 mass %.

Next, a method of forming a cured product from the resin composition according to the present invention will be described below.

The method of forming a cured product according to the present invention includes an application step of applying, onto a substrate, the resin composition of the present invention described so far; and a cured product forming step of forming the cured product by heating the substrate on which the resin composition of the present invention is applied. To be able to obtain a cured product with good electric conductivity, the temperature of the cured product forming step is preferably in a range of 50° C. to 200° C., and especially preferably in a range of 100° C. to 200° C. The heating period of the cured product forming step is preferably in a range of 1 to 300 min, and preferably in a range of 10 to 60 min. If necessary, the method of forming a cured product according to the present invention may further include, before the cured product forming step, a drying step of holding, at a temperature of 50° C. to 150° C., the substrate or the substrate on which the resin composition according to the present invention is applied, so as to evaporate off low boiling point components of the organic solvent or the like therefrom.

Examples of applying methods usable in the applying step includes spin-coating, dipping, spray-coating, mist-coating, flow-coating, curtain-coating, roll-coating, knife-coating, bar-coating, slit-coating, screen-printing, gravure printing, offset-printing, ink-jetting, brushing, etc.

In order to obtain a necessary film thickness, it is possible to repeat from the applying step to a certain step a plurality of times. For example, all the steps from the applying step to the cured product forming step may be repeated a plurality of times, or the applying step and the drying step may be repeated a plurality of times.

Examples of applications of the cured product according to the present invention formed as above include electric conducting layers, electrode films, wiring, and the like.

EXAMPLES

In the following, the present invention will be described in detail referring to the Examples and Comparative Examples, but it should be understood that these Examples and Comparative Examples are not intended to limit the present invention thereto.

Example 1

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of stearic acid of 0.5 mass % with respect to the mass of the copper fine particles was added. Thereafter, separation and drying were carried out to obtain Example copper powder No. 1.

Example 2

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with methanol, of 20° C. to replace the water with methanol, thereby preparing a 20 mass % copper slurry. Into this 20 mass % copper blurry, a methanol solution of stearic acid of 0.5 mass % with respect to the mass of the copper fine particles was added. Thereafter, separation and drying were carried out to obtain Example copper powder No. 2.

Example 3

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with tetrahydrofuran of 20° C. to replace the water with tetrahydrofuran, thereby preparing a 20 mass % copper slurry. Into this 20 mass % copper slurry, a tetrahydrofuran solution of stearic acid of 0.5 mass % with respect to the mass of the copper fine particles was added. Thereafter, separation and drying were carried out to obtain Example copper powder No. 3.

Example 4

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of oleic acid of 0.5 mass % with respect to the mass of the copper fine particles was added. Thereafter, separation and drying were carried out to obtain Example copper powder No. 4.

Example 5

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of linolic acid of 0.5 mass % with respect to the mass of the copper fine particles was added. Thereafter, separation and drying were carried out to obtain Example copper powder No. 5.

Example 6

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of oleyl amine of 0.5 mass % with respect to the mass of the copper fine particles was added. Thereafter, separation and drying were carried out to obtain Example copper powder No. 6.

Example 7

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of stearic acid of 1.0 mass % with respect to the mass of the copper fine particles was added. Thereafter, separation and drying were carried out to obtain Example copper powder No. 7.

Example 8

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of oleic acid of 1.0 mass % with respect to the mess of the copper fine particles was added. Thereafter, separation and drying were carried out to obtain Example copper powder No. 8.

Example 9

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution containing oleic acid of 1.0 mass % with respect to the mass of the copper fine particles and lauric acid of 1.0 mass % with respect to the mass of the copper fine particles was added. Thereafter, separation and drying were carried out to obtain Example copper powder No. 9.

Example 10

Copper fine particles [cumulative volume average particle diameter ($D_{50}$): 2.3 μm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of stearic acid of 2.0 mass with respect to the mass of the copper fine particles was added. Thereafter, separation and drying were carried out to obtain Example copper powder No. 10.

Comparative Example 1

Copper fine particles [cumulative volume average particle diameter ($D_{50}$): 2.3 µm] were added to pure water to prepare a 20 mass % copper slurry. After hydrazine monohydrate of 1 mass % with respect to the copper fine particles was added thereto, the copper slurry was stirred at 25° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of stearic acid of 0.5 mass % with respect to the mass of the copper fine particles was added. Thereafter, separation and drying were carried out to obtain Comparative copper powder 1.

Comparative Example 2

Copper fine particles [cumulative volume average particle diameter ($D_{50}$): 2.3 µm] were added to pure water to prepare a 20 mass % copper slurry. After ammonium hypophosphite of 1 mass % with respect to the copper fine particles was added thereto, the copper slurry was stirred at 70° C. for 1 hour. Thereafter, the copper slurry was washed with water of 20° C. and then with 2-propanol of 20° C. to replace the water with 2-propanol, thereby preparing a 20 mass % copper slurry. Into this 20 mass % copper slurry, a 2-propanol solution of stearic acid of 0.5 mass % with respect to the mass of the copper fine particles was added. Thereafter, separation and drying were carried out to obtain Comparative copper powder 2.

Comparative Example 3

Copper fine particles [cumulative volume average particle diameter ($D_{50}$): 2.3 µm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with 2-propanol without water washing in order to replace the water with 2-propanol, thereby preparing a 20 mass % copper slurry. Into this 20 mass % copper slurry, a 2-propanol solution of stearic acid of 0.5 mass % with respect to the mass of the copper fine particles was added. Thereafter, separation and drying were carried out to obtain Comparative copper powder 3.

Comparative Example 4

Copper fine particles [cumulative volume average particle diameter ($D_{50}$): 2.3 µm] were added to pure water to prepare a 20 mass % copper slurry. After sodium borohydride of 1 mass % with respect to the copper fine particles was added thereto, the copper slurry was stirred at 25° C. for 1 hour. Thereafter, the copper slurry was washed with water of 20° C. and then with toluene to replace the water with toluene, thereby preparing a 20 mass % copper slurry. Into this 20 mass % copper slurry, a toluene solution of stearic acid of 0.5 mass % with respect to the mass of the copper fine particles was added. Thereafter, separation and drying were carried out to obtain Comparative copper powder 4.

Comparative Example 5

Copper fine particles [cumulative volume average particle diameter ($D_{50}$): 2.3 µm] were added to pure water to prepare a 20 mass % copper slurry. Thereafter, the copper slurry was washed with 2-propanol to replace the water with 2-propanol, thereby preparing a 20 mass % copper slurry. Into this 20 mass copper slurry, a 2-propanol solution of stearic acid of 0.5 mass % with respect to the mass of the copper fine particles was added. Thereafter, separation and drying were carried out to obtain Comparative copper powder 5.

Examples 11 to 23

Each component was mixed in the combinations as shown on Table 1, thereby preparing resin compositions (Example resin compositions Nos. 1 to 13). In Examples 11 to 21, each component was mixed at such a mass ratio that Component (A) Component (B)=5:1. In examples 22 and 23, each component was mixed at such a mass ratio that Component (A):Component (B)=8:1.

TABLE 1

| | Resin Composition | Component (A) | Component (B) |
|---|---|---|---|
| Example 11 | Example Resin Composition No. 1 | Example Copper Powder No. 1 | B-1 |
| Example 12 | Example Resin Composition No. 2 | Example Copper Powder No. 2 | B-1 |
| Example 13 | Example Resin Composition No. 3 | Example Copper Powder No. 3 | B-1 |
| Example 14 | Example Resin Composition No. 4 | Example Copper Powder No. 4 | B-1 |
| Example 15 | Example Resin Composition No. 5 | Example Copper Powder No. 5 | B-1 |
| Example 16 | Example Resin Composition No. 6 | Example Copper Powder No. 6 | B-1 |
| Example 17 | Example Resin Composition No. 7 | Example Copper Powder No. 7 | B-1 |
| Example 18 | Example Resin Composition No. 8 | Example Copper Powder No. 8 | B-1 |
| Example 19 | Example Resin Composition No. 9 | Example Copper Powder No. 9 | B-1 |
| Example 20 | Example Resin Composition No. 10 | Example Copper Powder No. 10 | B-1 |
| Example 21 | Example Resin Composition No. 11 | Example Copper Powder No. 11 | B-2 |
| Example 22 | Example Resin Composition No. 12 | Example Copper Powder No. 12 | B-3 |
| Example 23 | Example Resin Composition No. 13 | Example Copper Powder No. 13 | B-4 |

In Table 1,
B-1: PL-2211 (Resol type phenol resin from Gun Ei Chemical Industry Co., Ltd)
B-2: PL-5208 (Resol type phenol resin from Gun Ei Chemical Industry Co., Ltd)
B-3: UE-3220 (Polyester resin from Unitika Ltd. with number average molecular weight of 25,000 and glass transition point of 5° C.)
B-4: BR-113 (Acrylic resin from Mitsubishi Rayon with weight average molecular weight of 30,000 and glass transition point of 75° C.)

Comparative Examples 6 to 10

Each component was mixed in the combinations as shown on Table 2, thereby preparing resin compositions (Comparative compositions Nos. 1 to 5). Each component was mixed at such a mass ratio that Component (A):Component (B)=5:1.

TABLE 2

|  | Resin Composition Component (A) | Component (B) |
|---|---|---|
| C. Example 6 | Comparative resin Composition No. 1 | Comparative Copper Powder No. 1 | B-1 |
| C. Example 7 | Comparative resin Composition No. 2 | Comparative Copper Powder No. 2 | B-1 |
| C. Example 8 | Comparative resin Composition No. 3 | Comparative Copper Powder No. 3 | B-1 |
| C. Example 9 | Comparative resin Composition No. 4 | Comparative Copper Powder No. 4 | B-1 |
| C. Example 10 | Comparative resin Composition No. 5 | Comparative Copper Powder No. 5 | B-1 |

Examples 24 to 36

Example resin compositions Nos. 1 to 13 were applied on a PET film to make a film thickness in a range of 10 to 20 µm by bar-coating. Here, diethylene glycol monobutyl ether was used as a solvent to adjust the film thickness of each of the resin compositions. After the application, the resin compositions were thermally baked at 150° C. for 30 min in the atmosphere, thereby obtaining films of Example cured products Nos. 1 to 13, respectively.

Comparative Examples 11 to 15

Comparative Example resin compositions 1 to 5 were applied on a PET film to make a film thickness in a range of 10 to 20 µm by bar-coating. Here, diethylene glycol monobutyl ether was used as a solvent to adjust the film thickness of each of the resin compositions. After the application, the resin compositions were thermally baked at 150° C. for 30 min in the atmosphere, thereby obtaining films of Comparative Example cured products Nos. 1 to 5, respectively.

Evaluation Examples

Example cured products Nos. 1 to 13 and Comparative Example cured products 1 to 5 were measured in volume resistance by four-terminal sensing method (Product name: Loresta GP made by Mitsubishi Chemical Analytech Co., Ltd.). The results are shown on Table 3.

TABLE 3

|  | Cured Products | Volume Resistance ($\Omega$ cm) |
|---|---|---|
| Evaluation Example 1 | Example Cured Product No. 1 | $6.1 \times 10^{-5}$ |
| Evaluation Example 2 | Example Cured Product No. 2 | $7.9 \times 10^{-5}$ |
| Evaluation Example 3 | Example Cured Product No. 3 | $2.8 \times 10^{-4}$ |
| Evaluation Example 4 | Example Cured Product No. 4 | $3.5 \times 10^{-5}$ |
| Evaluation Example 5 | Example Cured Product No. 5 | $5.0 \times 10^{-5}$ |
| Evaluation Example 6 | Example Cured Product No. 6 | $1.7 \times 10^{-4}$ |
| Evaluation Example 7 | Example Cured Product No. 7 | $1.6 \times 10^{-4}$ |
| Evaluation Example 8 | Example Cured Product No. 8 | $1.0 \times 10^{-4}$ |
| Evaluation Example 9 | Example Cured Product No. 9 | $6.9 \times 10^{-5}$ |
| Evaluation Example 10 | Example Cured Product No. 10 | $6.7 \times 10^{-5}$ |
| Evaluation Example 11 | Example Cured Product No. 11 | $1.3 \times 10^{-4}$ |
| Evaluation Example 12 | Example Cured Product No. 12 | $6.9 \times 10^{-4}$ |
| Evaluation Example 13 | Example Cured Product No. 13 | $8.7 \times 10^{-4}$ |
| Comparative Evaluation Example 1 | Comparative Cured Product 1 | $1.6 \times 10^{-1}$ |
| Comparative Evaluation Example 2 | Comparative Cured Product 2 | $\infty$ |
| Comparative Evaluation Example 3 | Comparative Cured Product 3 | $\infty$ |
| Comparative Evaluation Example 4 | Comparative Cured Product 4 | $6.3 \times 10^{-3}$ |
| Comparative Evaluation Example 5 | Comparative Cured Product 5 | $1.2 \times 10^{-3}$ |

The results shown on Table 3 demonstrated that Evaluation Examples 1 to 13 exhibited better volume resistance than Comparative Evaluation Examples 1 to 5.

The invention claimed is:

1. A method for manufacturing copper powder, comprising:
a first step of reducing copper particles by adding at least one compound selected from the group consisting of potassium borohydride, sodium borohydride, and lithium borohydride to a copper slurry consisting of copper particles that comprise oxidized copper particles, and water;
after the first step, a second step of washing with at least one washing liquid selected from the group consisting of water, methanol, and ethanol to obtain a second step copper powder;
a third step of washing the second step copper powder with at least one compound selected from the group consisting of ether compounds and alcohol compounds to obtain a third step copper powder; and
a fourth step of bringing the third step copper powder into contact with a solution containing at least one selected from the group consisting of organic acids and organic amines, wherein at least one compound selected from the group consisting of ether compounds and alcohol compounds is used as a solvent.

* * * * *